(12) United States Patent
Kadoch (10) Patent No.: US 11,166,559 B1
(45) Date of Patent: Nov. 9, 2021

(54) FURNITURE WITH PORTABLE CONVERSION MEANS

(71) Applicant: Mayer Kadoch, Brooklyn, NY (US)

(72) Inventor: Mayer Kadoch, Brooklyn, NY (US)

(*) Notice: Subject to any disclaimer, the term of this patent is extended or adjusted under 35 U.S.C. 154(b) by 91 days.

(21) Appl. No.: 16/661,249

(22) Filed: Oct. 23, 2019

(51) Int. Cl.
| | | |
|---|---|---|
| *A47C 3/00* | (2006.01) | |
| *A47C 7/00* | (2006.01) | |
| *B60B 33/04* | (2006.01) | |
| *B60B 33/00* | (2006.01) | |
| *A47C 9/02* | (2006.01) | |
| *B60B 33/08* | (2006.01) | |
| *B60B 33/06* | (2006.01) | |
| *A47C 3/026* | (2006.01) | |
| *A47C 1/032* | (2006.01) | |

(52) U.S. Cl.
CPC .......... *A47C 7/006* (2013.01); *B60B 33/0002* (2013.01); *B60B 33/04* (2013.01); *A47C 1/03255* (2013.01); *A47C 3/026* (2013.01); *A47C 7/004* (2013.01); *A47C 9/02* (2013.01); *B60B 33/06* (2013.01); *B60B 33/08* (2013.01)

(58) Field of Classification Search
CPC ..... A47C 3/026; A47C 1/03255; A47C 7/004; A47C 7/006; A47C 9/02; B60B 33/06; B60B 33/08; B60B 33/04; B60B 33/0002
See application file for complete search history.

(56) References Cited

U.S. PATENT DOCUMENTS

| | | | |
|---|---|---|---|
| 1,016,324 A | 2/1912 | Dunn | |
| 1,016,745 A * | 2/1912 | Henrikson | B60B 33/06 16/32 |
| 2,767,420 A | 10/1956 | Riccio | |
| 2,770,831 A | 11/1956 | Angelica et al. | |
| 3,159,865 A * | 12/1964 | Shepherd | A61G 7/00 16/35 R |
| 4,117,999 A | 10/1978 | Gessler | |
| 4,800,617 A | 1/1989 | Yeh | |
| 5,125,623 A * | 6/1992 | Kiedinger | E03C 1/052 137/801 |
| 6,283,437 B1 | 9/2001 | Kang | |
| 6,419,319 B1 | 7/2002 | Sakurai | |
| 6,568,031 B1 | 5/2003 | Polevoy et al. | |
| 7,588,219 B2 | 9/2009 | Levine et al. | |
| 8,720,994 B2 * | 5/2014 | Gorgi | A47C 1/03205 297/313 |
| 8,943,648 B2 | 2/2015 | Fanourgiakis et al. | |
| 8,978,202 B2 | 3/2015 | Cook | |
| 9,481,207 B2 | 11/2016 | Fanourgiakis et al. | |
| 2015/0266342 A1 * | 9/2015 | Howard | A61G 7/0528 701/36 |

* cited by examiner

*Primary Examiner* — Syed A Islam
(74) *Attorney, Agent, or Firm* — Cramer Patent & Design, PLLC; Aaron R. Cramer (57) ABSTRACT

An article of furniture has retractable and extendable wheels secured beneath each leg. The mechanism for retraction and extension is accomplished by an activation means in mechanical communication with each wheel.

15 Claims, 6 Drawing Sheets

FURNITURE WITH PORTABLE CONVERSION MEANS

RELATED APPLICATIONS

Not applicable.

FIELD OF THE INVENTION

The present invention relates to furniture with portable conversion means.

BACKGROUND OF THE INVENTION

Most chairs found in almost any living or business space can be categorized into two (2) categories: those with casters and those without. Chairs with casters are ideal for office chairs, conference chairs, worktable chairs, or anywhere easy movement of the chair is desired. However, such chairs do not work well in-home environments due to the fact that they move too easily and give the space a commercial environment look. However, locations such as kitchen and dining room tables could certainly benefit from the ease of movement, especially with crowded tables or with individuals who may be elderly, disabled, or find moving the chair in and away from the table difficult. Accordingly, there exists a need for a means by which chairs can be easily converted from a chair with casters to a chair without casters at a moment's notice to suit the needs of the situation. The development of the chair with retractable casters fulfills this need.

SUMMARY OF THE INVENTION

The inventor has recognized the aforementioned, inherent problems and lack in the art and observed that there is a need for a convertible furniture with a plurality of casters device comprising a center shaft of the caster which is attached to a retraction/locking mechanism that includes a plurality of interlocking segments which travel along a plurality of retraction tracks, a furniture body section and a furniture leg section having a plurality of legs. The legs are disposed underneath the furniture body section and each of the casters are coupled to each end of the legs.

The device also comprises an enclosure which is located on an underside of a seat of the furniture body section and an operating lever housed within the enclosure. The operating lever simultaneously controls four Bowden cables that are routed from the enclosure to an upper portion of each of the legs. The Bowden cables each having an outer sleeve and an inner cable that enter the enclosure. The inner cable is routed into the interior of the enclosure and mechanically secured to a flywheel actuating disc. The device also comprises a flywheel actuating disc which is secured to a pivot point and mechanically affixed to the operating lever.

The center shaft may be secured by a lever action and cannot be disengaged from force applied through one of the casters. The center shaft may be controlled by the inner cable connected to a standoff bracket in which a second coupling restrains the outer sleeve. Each of the casters may be retracted by pulling each of the inner cables upon the interlocking segments along the standoff bracket to allow a leg ferrule to contact a floor surface and allow for support of the convertible furniture. The enclosure may be located on the underside of the seat located near the front of the convertible furniture. The operating lever may be positioned in a retracted detent position. The operating lever may also be positioned in the retracted detent position as indicated by a retracted position of the casters.

The operating lever may be positioned in an extended detent position or the operating lever may be positioned in the extended detent position provided at an opposite end of an operating lever travel path. The operating lever may move from the retracted detent position to the extended detent position by application of hand force. The Bowden cables may be attached to the underside of the seat by a plurality of retention clips such that they are not visible under normal usage. The Bowden cable may extend upward to the upper portion of each of the legs where it exits via a bushing. The Bowden cable may be attached to the underside of the seat by the retention clips. The outer sleeve may be terminated and secured to the enclosure by use of a first couplings.

The inner cable may be routed into the interior of the enclosure and may be mechanically secured to the flywheel actuating disc at one hundred eighty-degree intervals. The inner cable may be routed into the interior of the enclosure and mechanically secured to the flywheel actuating disc with a rotatable fastening means. The rotatable fastening means may be a pivot pin.

The operating lever may be moved from the retracted detent position to the extended detent position and the inner cables will move outward a corresponding amount. The convertible furniture may comprise a chair. Each of the casters may be provided with a carriage and a ball bearing assembly to allow for three-hundred-sixty degrees of movement.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY 10 convertible furniture
15 furniture body section
20 furniture leg section
25 leg
30 seat
35 enclosure 40 operating lever
45 retracted detent position
50 extended detent position
55 operating lever travel path
60 caster
65 lever travel path "l"
70 front
75 Bowden cable
80 retention clip
85 flywheel actuating disc
90 pivot point
95 outer sleeve
100 inner cable
105 first coupling
110 rotatable fastening means
112 cable travel path "c"
115 carriage
120 ball bearing assembly
125 center shaft
130 retraction/locking mechanism
135 interlocking segment
140 retraction track
145 standoff bracket
150 second coupling
155 bushing
160 floor surface
165 leg ferrule

DESCRIPTION OF THE PREFERRED EMBODIMENTS

The best mode for carrying out the invention is presented in terms of its preferred embodiment, herein depicted within FIGS. 1 through 5. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. Detailed Description of the Figures

Figure 1:
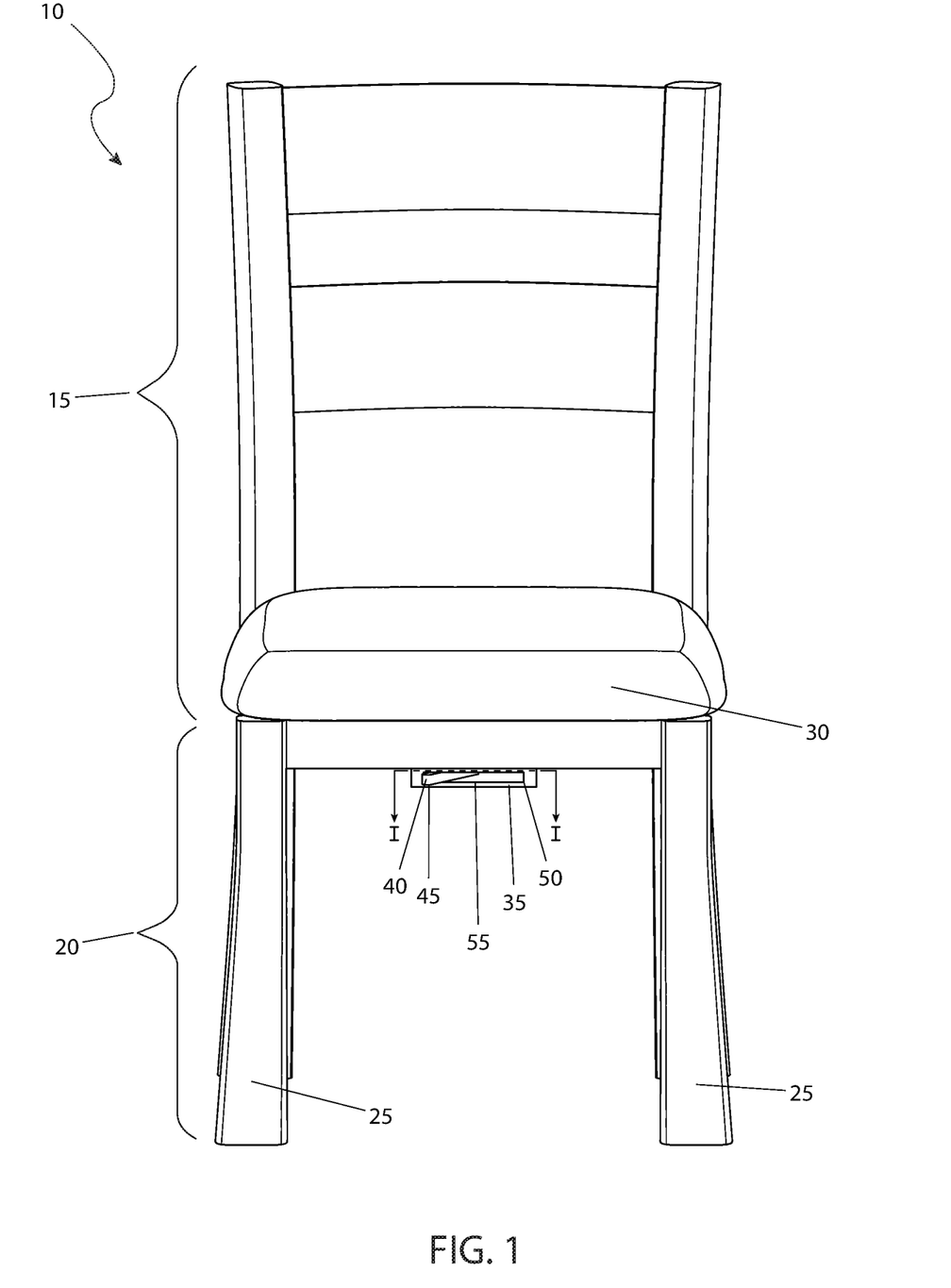
FIG. 1 is an isometric view of the convertible furniture 10 with casters 60 in a retracted state, according to the preferred embodiment of the present invention.

Referring now to FIG. 1, an isometric view of the convertible furniture 10, with casters 60 (not visible in this view) in a retracted state, according to the preferred embodiment of the present invention is disclosed. The convertible furniture (herein also described as the "furniture") 10, includes a furniture body section 15 and a furniture leg section 20. Both the furniture body section 15 and the furniture leg section 20 have no special design features, attributes or stylings. The teachings of the furniture 10 can be adopted into almost any style of furniture, such as those used in a living room, dining room, board room, office space, work room, or the like. Preferably, and in the exemplary embodiment, such an article of furniture 10 is chair, although other styles of furniture 60 such as tables, fall under the overall scope of the present invention. The teachings of the present invention may be incorporated into armchair, a cantilever chair, a wing chair, a desk chair, an executive chair, a stool, a Windsor chair, a waiting room seat, a student chair, a dining room chair, a boardroom chair, child's highchair, or almost any type of chair. As such, the style, size, appearance, finish, color, or other physical attribute of the furniture body section 15 or the furniture leg section 20 is not intended to be a limiting factor of the present invention.

The furniture leg section 20 is provided with multiple legs 25. Located on the underside of the seat 30 is an enclosure 35, housing an operating lever 40. The operating lever 40 is positioned in a retracted detent position 45 as indicated by the retracted position of the casters 60 (not shown in this figure). An extended detent position 50 is provided at the opposite end of the operating lever travel path 55, whose operation will be described in greater detail herein below.

Figure 2:
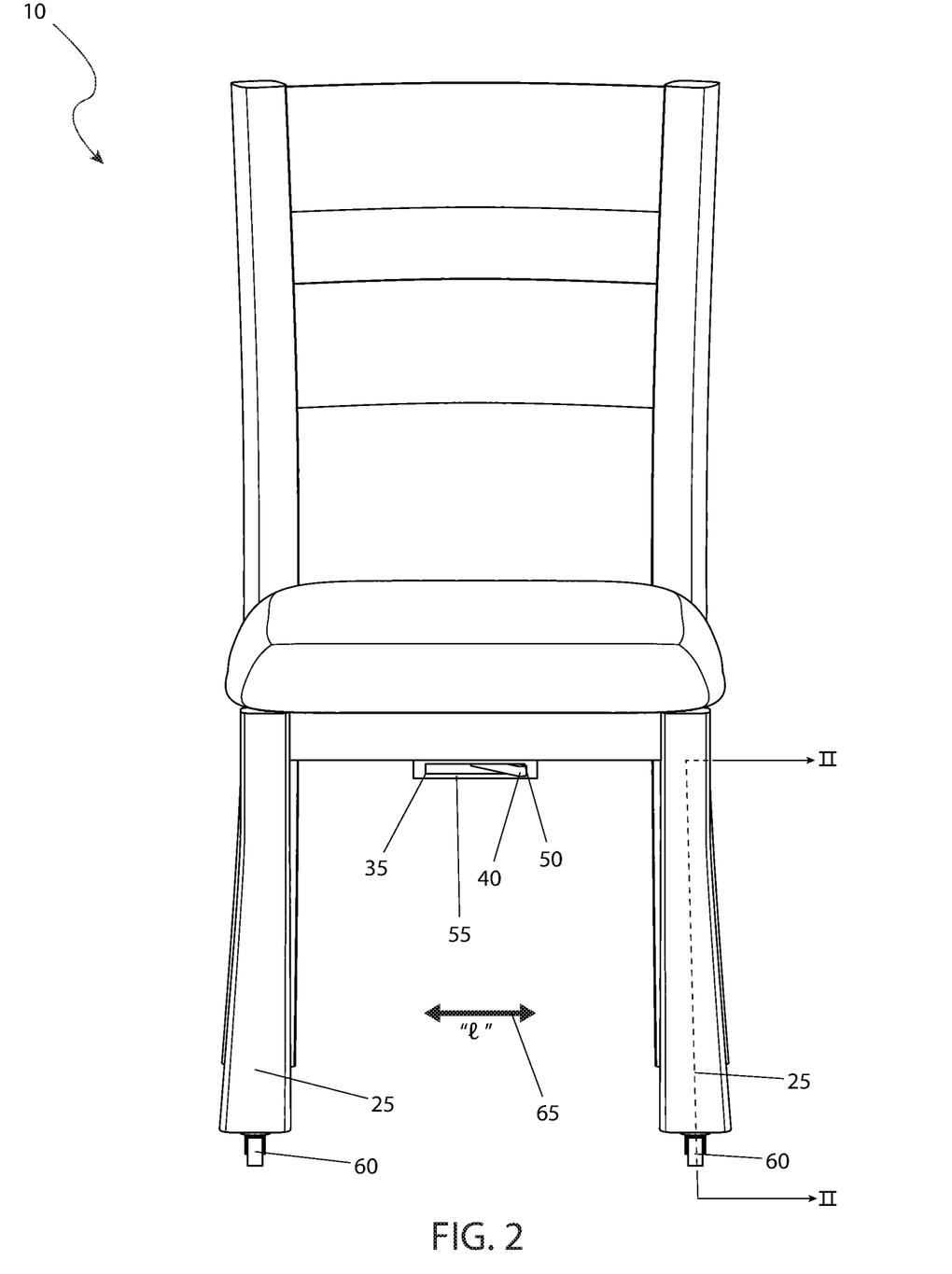
FIG. 2 is an isometric view of the convertible furniture 10 with casters 60 in an extended state, according to the preferred embodiment of the present invention.

Referring next to FIG. 2, an isometric view of the furniture 10 with the casters 60 in an extended state, according to the preferred embodiment of the present invention is depicted. This view is remarkably similar to that of FIG. 1, with the exception of the casters 60 in an extended and locked state on each of the four (4) legs 25. The operating lever 40 is thusly located in the extended detent position 50 of the operating lever travel path 55 of the enclosure 35. The operating lever 40 moves from the retracted detent position 45 (as shown in FIG. 1) to the extended detent position 50 by application of hand force along a lever travel path "l" 65. The deployment of the casters 60, would be utilized when moving the furniture 10 for cleaning, room rearrangement, travel towards and away from a dining table, kitchen table, worktable or the like.

Figure 3:
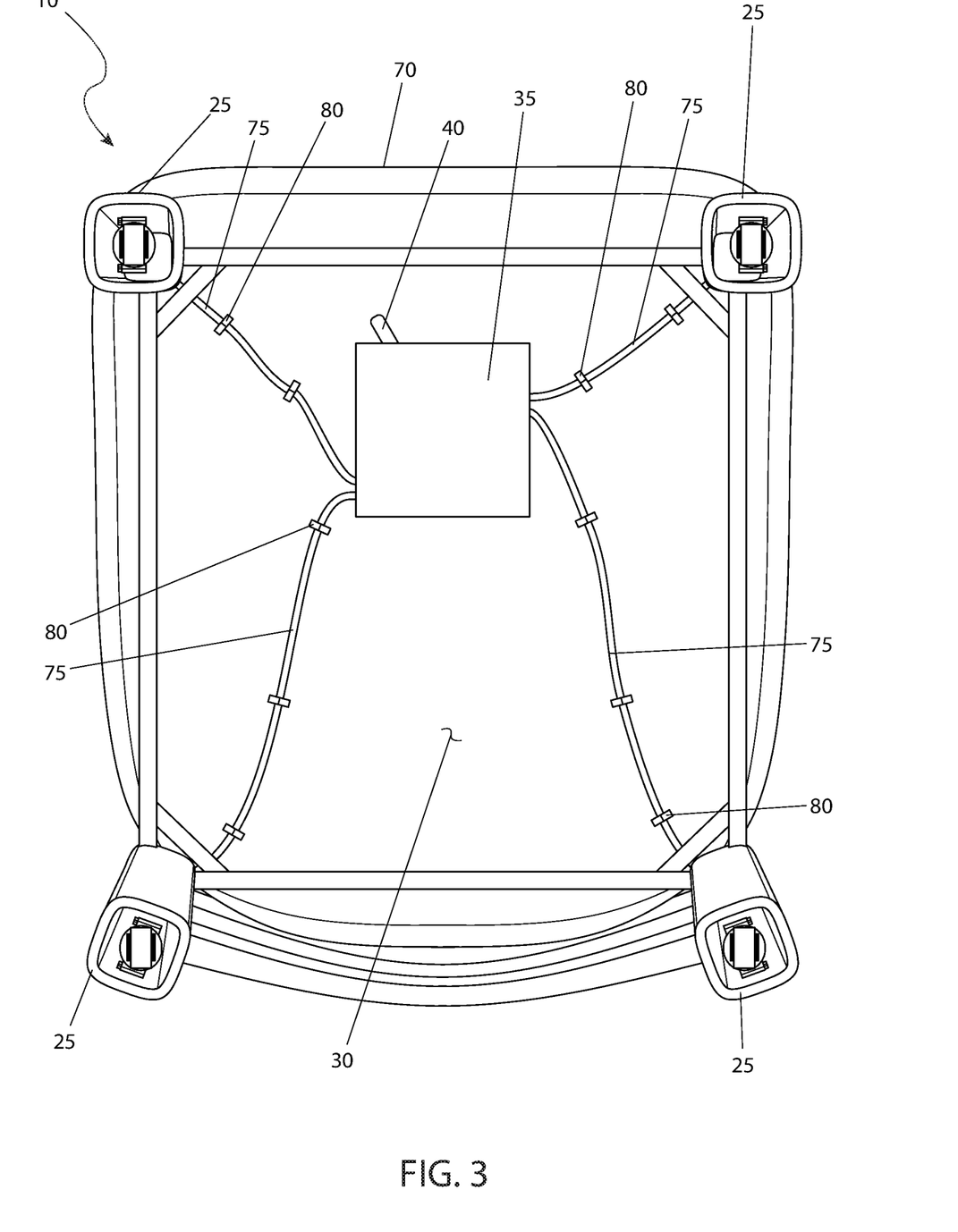
FIG. 3 is a bottom view of the convertible furniture 10, according to the preferred embodiment of the present invention.

Referring now to FIG. 3, a bottom view of the furniture 10, according to the preferred embodiment of the present invention is shown. This view clearly discloses the enclosure 35 located on the underside of the seat 30 located near the front 70 of the furniture 10. The operating lever 40 simultaneously controls four (4) Bowden cables 75 that are routed from the enclosure 35 to the upper portion of each leg 25. The Bowden cables 75 are attached to the underside of the seat 30 by multiple retention clips 80 such that they are not visible under normal usage. Further explanation on the inner workings of the enclosure 35 as well as the four (4) legs 25 will be provided herein below.

Figure 4:
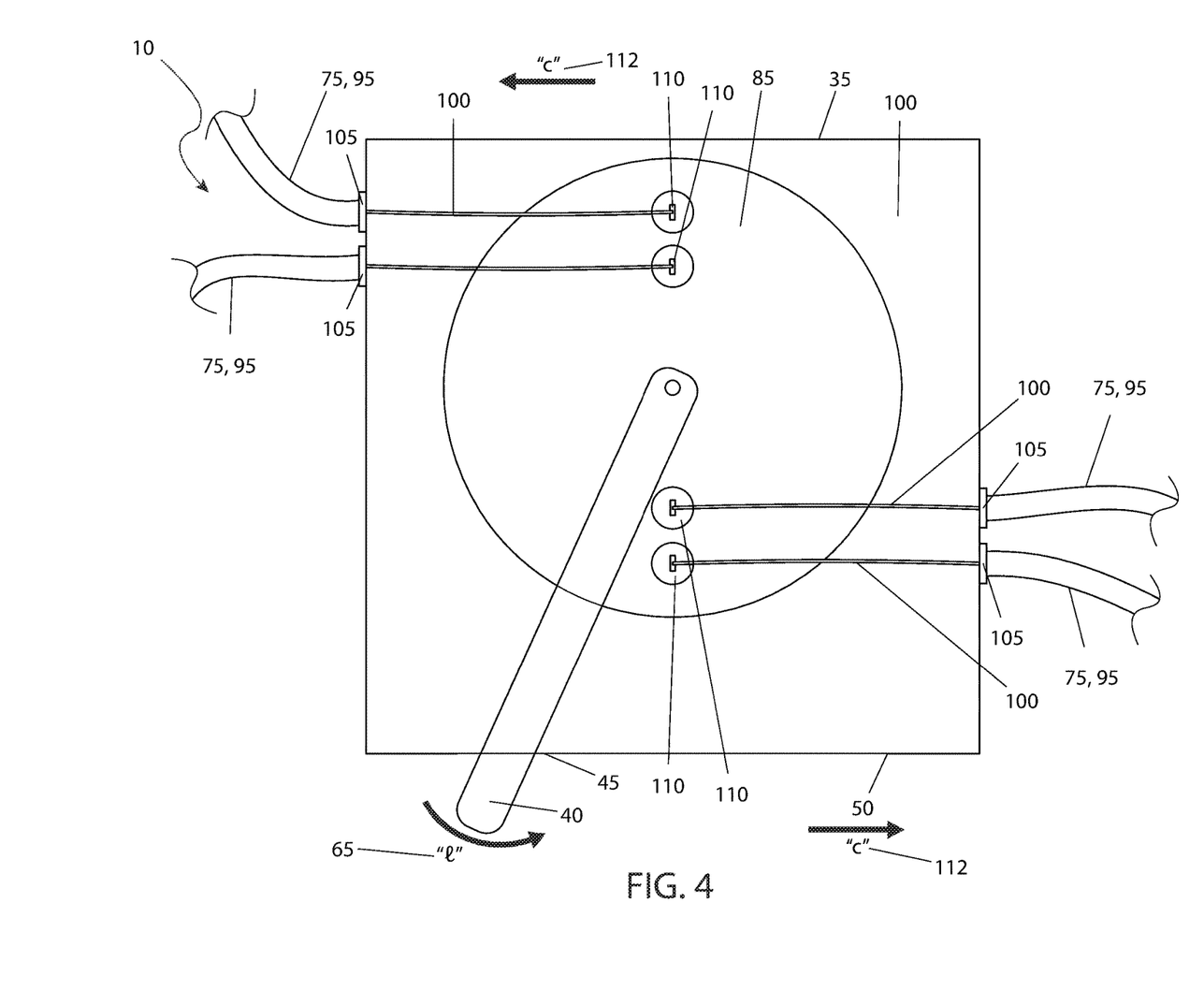
FIG. 4 is a sectional view of the convertible furniture 10, as seen along a line I-I, as shown in FIG. 1, according to the preferred embodiment of the present invention.

Referring next to FIG. 4, a sectional view of the furniture 10, as seen along a line I-I, as shown in FIG. 1, according to the preferred embodiment of the present invention is disclosed. This view provides additional disclosure on the inner working of the enclosure 35, as viewed from the interior thereof. A flywheel actuating disc 85, secured to a pivot point 90, is mechanically affixed to the operating lever 40. The Bowden cables 75, each having an outer sleeve 95 and an inner cable 100, similar to a bicycle brake control cable, enters the enclosure 35 as shown. The outer sleeve 95 is terminated and secured to the enclosure 35 by use of a first couplings 105. The inner cable 100 is routed into the interior of the enclosure 35 and mechanically secured to the flywheel actuating disc 85 at one hundred eighty-degree (180°) intervals with a rotatable fastening means 110 such as a pivot pin. As such, whenever the operating lever 40 is moved from the retracted detent position 45 to the extended detent position 50, as described by the lever travel path "l" 65, all inner cables 100 will move outward a corresponding amount, as defined by a cable travel path "c" 112.

Figure 5:
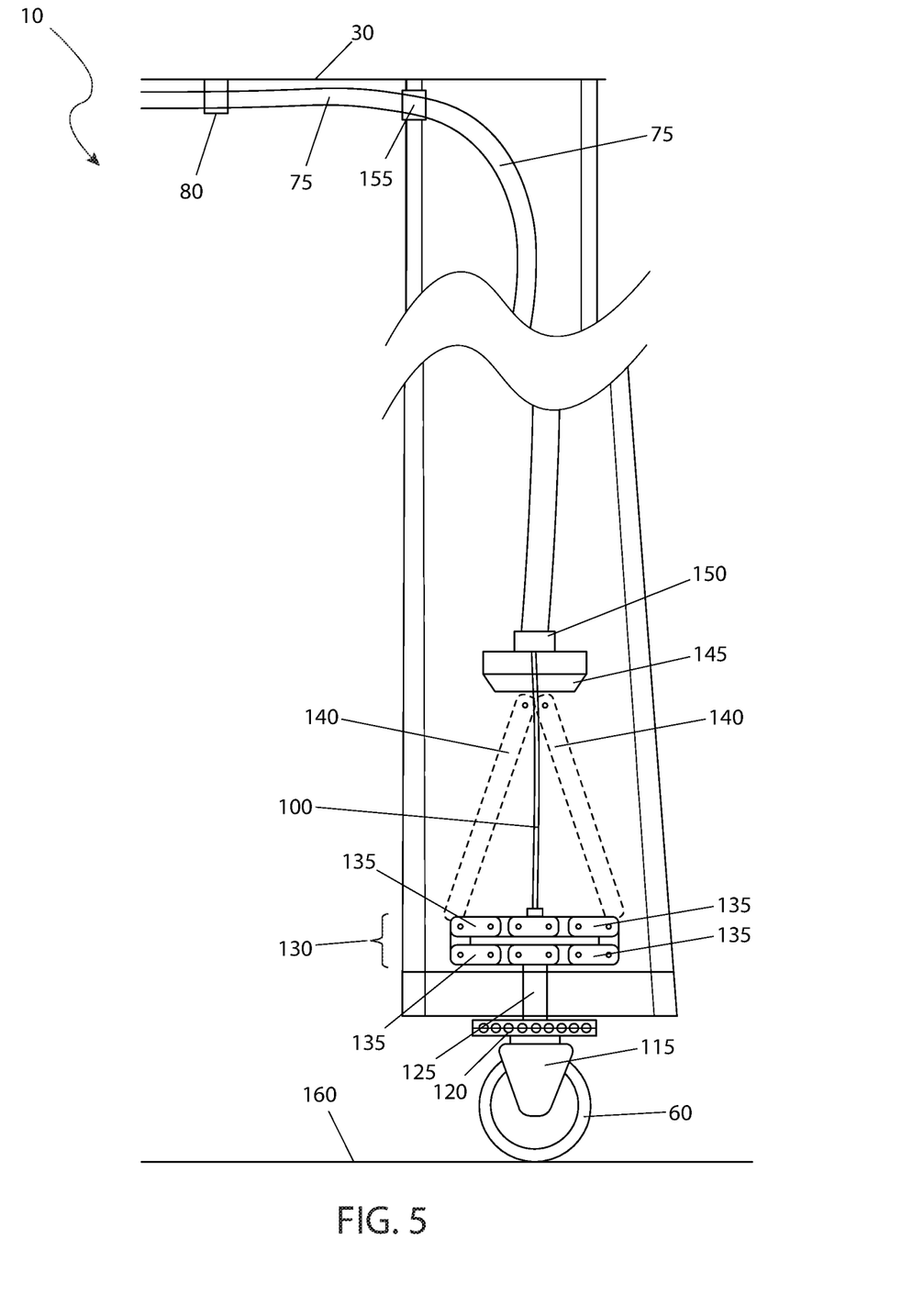
FIG. 5 is a sectional view of the convertible furniture 10, as seen along a line II-II, as shown in FIG. 2, with the casters 60 in an extended state, according to the preferred embodiment of the present invention; and, FIG. 6 is a sectional view of the convertible furniture 10, as seen along a line II-II, as shown in FIG. 2, with the casters 60 in an extended state, according to the preferred embodiment of the present invention.

Referring now to FIG. 5, a sectional view of the furniture 10, as seen along a line II-II, as shown in FIG. 2, with the casters 60 in an extended state, according to the preferred embodiment of the present invention is depicted. This view provides additional disclosure on the inner workings of the legs 25. It is understood that the clarifications provided in FIG. 5 apply equally to each of the four (4) legs 25 (as shown in FIG. 1 and FIG. 2). Each caster 60 is provided with a carriage 115 and a ball bearing assembly 120 to allow for three-hundred-sixty degree (360°) of movement. The center shaft 125 of the caster 60 is attached to a retraction/locking mechanism 130 consisting of interlocking segments 135 which travel along retraction tracks 140 (shown via dashed lines). In its lowered or extended position as shown, it is secure by a lever action and cannot be disengaged no matter the amount of force applied through the caster 60. It is controlled by the inner cable 100 connected to a standoff bracket 145 in which a second coupling 150 restrains the outer sleeve 95. The Bowden cable 75 extends upward to the upper portion of the leg 25 where it exits via a bushing 155 and is attached to the underside of the seat 30 by the retention clips 80. As such, the configuration as presented allows the caster 60 to ride upon a floor surface 160.

Figure 6:
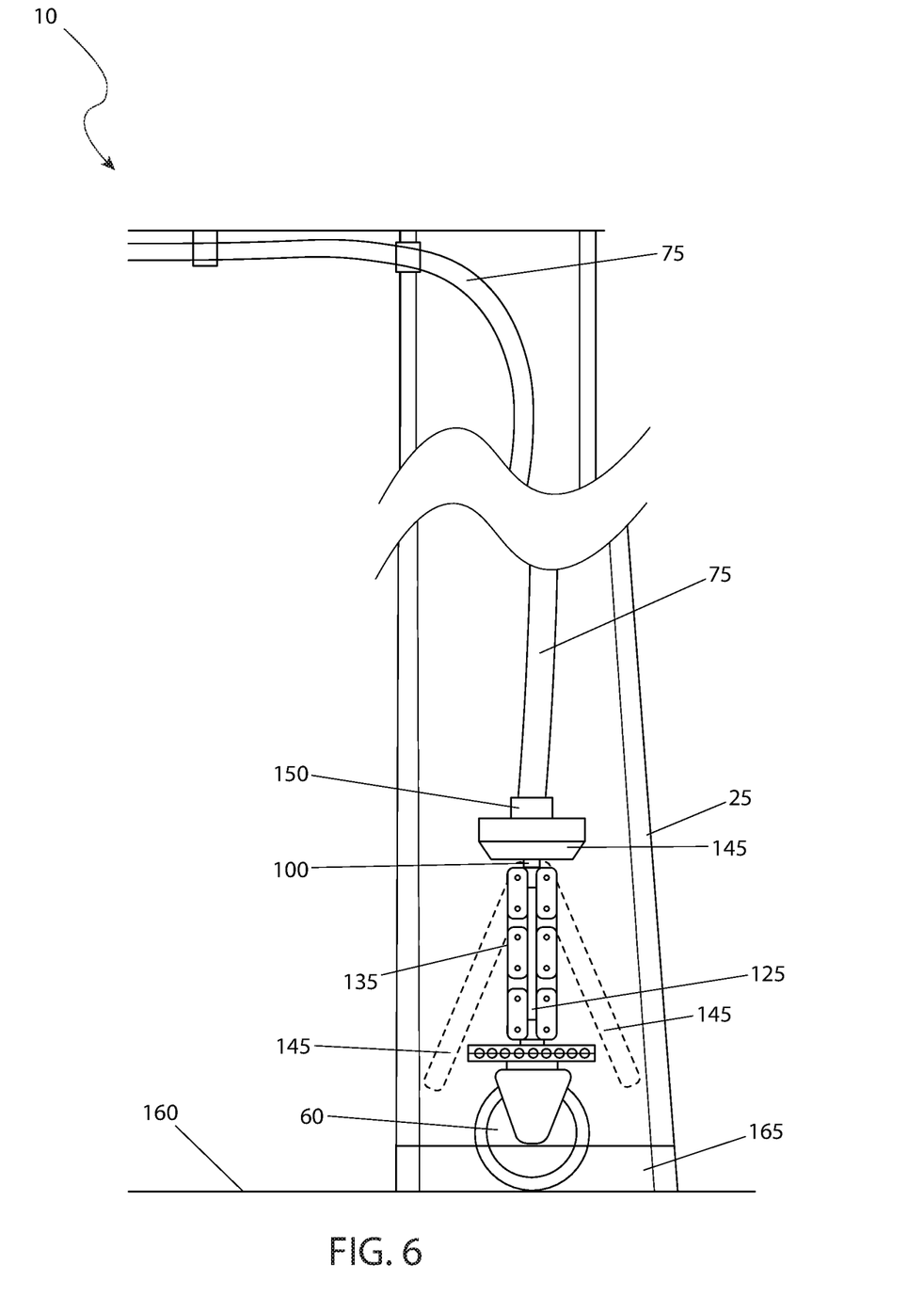

Referring to FIG. 6, a sectional view of the furniture 10, as seen along a line II-II, as shown in FIG. 2, with the casters 60 in an extended state, according to the preferred embodiment of the present invention. This view provides additional disclosure on the inner workings of the legs 25. It is understood that the clarifications provided in FIG. 5 apply equally to each of the four (4) legs 25 (as shown in FIG. 1 and FIG. 2). The casters 60 is retracted by pulling of the inner cable 100 upon the interlocking segments 135, along the standoff bracket 145. This allows a leg ferrule 165 to contact the floor surface 160 and allow for support of the furniture 10. The Bowden cable 75 as connected by the standoff bracket 145 and the second coupling 150 continues to act as previously described.

2. Operation of the Preferred Embodiment

The preferred embodiment of the present invention can be utilized by the common user in a simple and effortless manner with little or no training. It is envisioned that the furniture 10 would be constructed in general accordance with FIG. 1 through FIG. 5. The user would procure the furniture 10 via conventional procurement channels such as furniture stores, department stores, discount stores, mail order or internet supply houses and the like. Special attention would be paid to aesthetic appearance of the device 10 such as size, color, style and the like.

During utilization of the furniture 10, the following procedure would be initiated: the user would make a decision as to whether or not the functionality of the casters 60, allowing for easy movement of the furniture 10 is desired. If so, the user would place the operating lever 40 in the extended detent position 50 position thus extending the casters 60. If not, the user would place the operating lever 40 in the retracted detent position 45 position thus retracting the casters 60. This retraction and extension action is accomplished via the Bowden cables 75 with mechanical action applied at a first end by the flywheel actuating disc 85 and resultant mechanical application applied to the retraction/locking mechanism 130 at the second end. The Bowden cables 75 provides for multiple lengths, actions, and configurations, thus allowing for easy application on almost any style of furniture 10.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. A chair, comprising:
a plurality of casters;
a center shaft of each of the casters is attached to a retraction/locking mechanism that includes a plurality of interlocking segments which travel along a plurality of retraction tracks;
a body section;
a leg section having a plurality of legs, the legs are disposed underneath the body section and each of the casters are coupled to each end of the legs;
an enclosure located on an underside of a seat of the body section;
an operating lever housed within the enclosure, the operating lever simultaneously controls four Bowden cables that are routed from the enclosure to an upper portion of each of the legs, the Bowden cables each having an outer sleeve and an inner cable that enter the enclosure, the inner cable is routed into the interior of the enclosure and mechanically secured to a flywheel actuating disc; and
a flywheel actuating disc secured to a pivot point is mechanically affixed to the operating lever;
wherein the casters are easily removed to convert the chair with the casters to the chair without the casters;
wherein the center shaft is secured by a lever action and cannot be disengaged from force applied through one of the casters;
wherein the center shaft is controlled by the inner cable connected to a standoff bracket in which a second coupling restrains the outer sleeve;
wherein each of the casters are retracted by pulling each of the inner cables upon the interlocking segments along the standoff bracket to allow a leg ferrule to contact a floor surface and allow for support of the convertible chair; and
wherein the operating lever is positioned in a retracted detent position.

2. The chair, according to claim 1, wherein the enclosure is located on the underside of the seat located near the front of the convertible chair.

3. The chair, according to claim 1, wherein the operating lever is positioned in the retracted detent position as indicated by a retracted position of the casters.

4. The chair, according to claim 1, wherein the operating lever is positioned in an extended detent position.

5. The chair, according to claim 4, wherein the operating lever is positioned in the extended detent position provided at an opposite end of an operating lever travel path.

6. The chair, according to claim 1, wherein the operating lever moves from the retracted detent position to the extended detent position by application of hand force.

7. The chair, according to claim 1, wherein the Bowden cables are attached to the underside of the seat by a plurality of retention clips such that they are not visible under normal usage.

8. The chair, according to claim 1, wherein the Bowden cable extends upward to the upper portion of each of the legs where it exits via a bushing.

9. The chair, according to claim 8, wherein the Bowden cable is attached to the underside of the seat by the retention clips.

10. The chair, according to claim 1, wherein the outer sleeve is terminated and secured to the enclosure by use of a first couplings.

11. The chair, according to claim 1, wherein the inner cable is routed into the interior of the enclosure and mechanically secured to the flywheel actuating disc at one hundred eighty-degree intervals.

12. The chair, according to claim 1, wherein the inner cable is routed into the interior of the enclosure and mechanically secured to the flywheel actuating disc with a rotatable fastening means.

13. The chair, according to claim 12, wherein the rotatable fastening means is a pivot pin.

14. The chair, according to claim 1, wherein the operating lever is moved from the retracted detent position to the extended detent position and the inner cables will move outward a corresponding amount.

15. The chair, according to claim 1, wherein each of the casters is provided with a carriage and a ball bearing assembly to allow for three-hundred sixty degrees of movement.

\* \* \* \* \*